L. Loring.
Milking Stool.
No. 30,583. Patented Nov. 6, 1860.
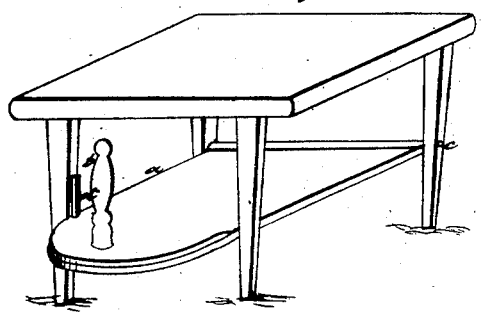
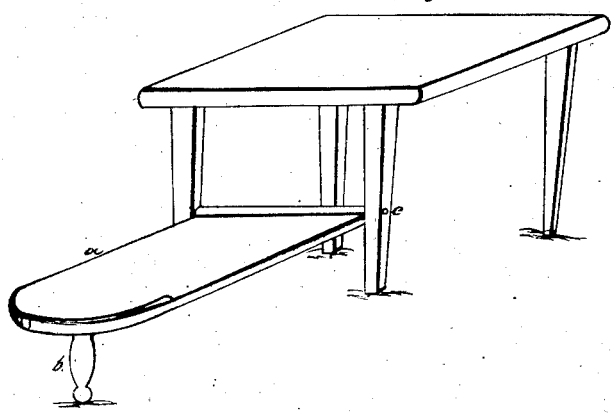
Witnesses
S. V. Loring
J. S. Mitchell
Inventor
Levi Loring

UNITED STATES PATENT OFFICE.

LEVI LORING, OF SACO, MAINE.

MILKING-STOOL.

Specification of Letters Patent No. 30,583, dated November 6, 1860.

*To all whom it may concern:*

Be it known that I, LEVI LORING, of Saco, in the county of York, in the State of Maine, have invented a new and Improved Mode of Constructing Milking-Stools; and I do hereby declare that the following is a full and exact description thereof, reference being had to the accompanying drawings and to the letters of reference marked thereon.

The nature of my invention consists in the attachment to a milking stool of the ordinary construction, a platform, or stand, on which the pail is to rest during the process of milking; which platform, or stand is made to open for the reception of the pail, and is closed by a spring.

Referring to the accompanying drawings, Figure 1 is the stool closed. Fig. 2 is the stool open and ready for use.

$a$, $a$ is the platform attached to the stool, and on which the pail is to be placed.

$b$, $b$ is the handle to the stool in Fig. 1 and the leg to the platform in Fig. 2.

$c$, $c$ is the bearing, or hinge, on which the platform $a$, $a$ turns.

$d$ is the spring which holds the platform when closed.

$e$ is fragment of leg of stool with spring attached.

What I claim as my invention, and desire to secure by Letters Patent, is—

The application to a milking stool of the platform, or stand, provided with a spring for fastening when closed—constructed as described and for the purpose specified.

LEVI LORING.

Witnesses:
JAS. J. WIGGIN,
S. V. LORING.